UNITED STATES PATENT OFFICE.

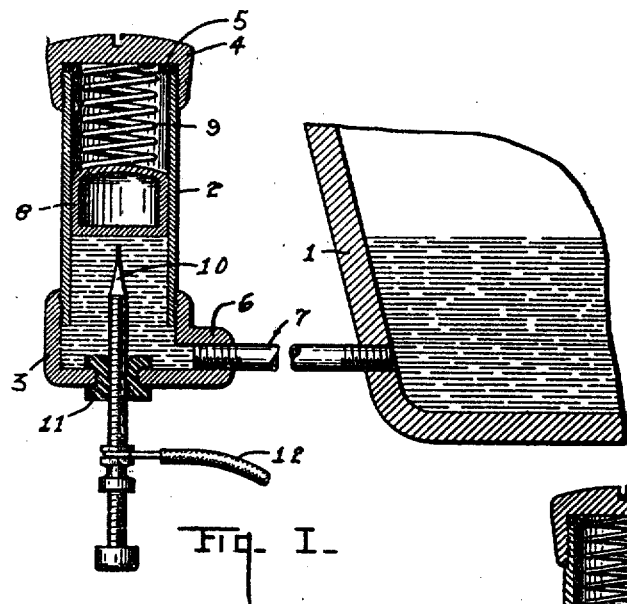
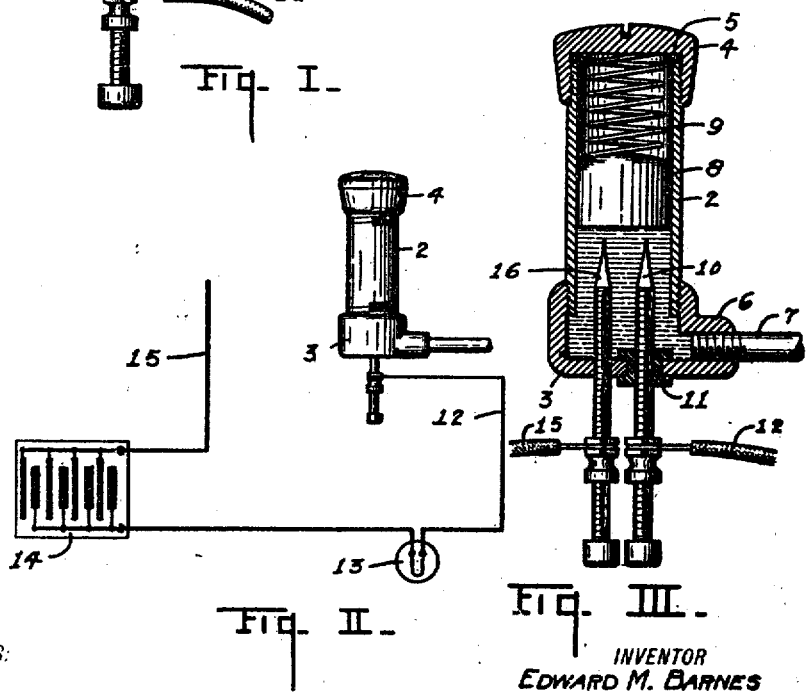

EDWARD M. BARNES, OF HASTINGS, MICHIGAN, ASSIGNOR, BY MESNE ASSIGNMENTS, TO KALAMAZOO UTILITIES CO., OF KALAMAZOO, MICHIGAN.

ALARM-GAGE.

1,202,757.

Specification of Letters Patent.   Patented Oct. 24, 1916.

Application filed June 24, 1915. Serial No. 36,135.

*To all whom it may concern:*

Be it known that I, EDWARD M. BARNES, a citizen of the United States, residing at Hastings, in the county of Barry and State of Michigan, have invented certain new and useful Improvements in Alarm-Gages, of which the following is a specification.

This invention relates to improvements in alarm gages.

My improved alarm gage is especially designed by me for use as an oil gage for the crank cases of internal combustion engines although it is adapted for use in various relations.

The main objects of my invention are: First, to provide an improved alarm gage for use on the crank cases of internal combustion engines which is efficient and at the same time economical to produce and one which may be readily installed on structures in common use such as the crank cases of motors of Ford motor cars. Second, to provide an improved alarm gage in which the parts are simple and few in number and the contacts are protected in use so that they are not likely to become ineffective through becoming coated with an insulating substance.

Further objects, and objects relating to structural details will definitely appear from the detailed description to follow.

I accomplish the objects of my invention by the devices and means described in the following specification.

The invention is clearly defined and pointed out in the claim.

A structure which is a preferred embodiment of my invention is clearly illustrated in the accompanying drawing forming a part of this specification, in which:

Figure I is a detail view mainly in vertical section of a structure embodying the features of my invention, my improved gage being shown connected to a motor crank case. Fig. II is a diagrammatic view showing the electrical connections. Fig. III is a detail vertical section of a slightly modified structure, a second pointed contact being provided.

In the drawing, similar reference characters refer to similar parts throughout the several views.

Referring to the drawing, 1 represents the crank case of an internal combustion engine. The casing of my improved gage consists of a cylindrical barrel 2, a base 3 and a cap 4. The barrel 2 is threaded into the base 3 and threaded to receive the cap 4. A gasket 5 is provided for the cap. The base is provided with a nipple 6 for the pipe 7 connecting the gage casing to the oil well of a crank casing as shown. This gage casing part being of metal and it being customary to ground the engine the casing is also grounded forming one of the electrical connections.

Within the casing is a cylindrical float 8 adapted to rise and fall therein, the float preferably being a comparatively good fit within the casing though free enough to permit it to rise and fall freely. Above the float is a coiled spring 9, the upper end of which engages the cap 4 and the lower end of which rests upon the float thus forming an electrical connection from the float to the casing. Below the float is a pointed contact 10. This contact is threaded through an insulating plug 11 in the bottom of the casing and is connected by the wire 12 to the signal lamp or alarm 13, shown conventionally in Fig. II. A battery 14 is shown conventionally. The circuit wire 15 is grounded in the crank case 1 but if desired a separate pointed contact 16 may be threaded into the bottom of the casing and connected to the wire 15. (See modification in Fig. III.) These pointed contacts pierce any film of oil on the bottom of the float insuring a good contact connection. The coiled spring 9 serves to maintain the electrical connection between the float and the casing even though the float should become insulated by a covering of oil.

My improved gage alarm is simple and economical in its parts and readily applied, and is not likely to get out of repair in use, or to become ineffective as the spring 9 maintains an effective electrical connection from the float to the casing while the pointed contact will pierce any film of oil that may be on the bottom of the float, and makes an effective contact. This contact may be adjusted according to the level of the fluid at which it is desired that the alarm shall be given.

I have not in the accompanying drawing attempted to maintain the relative proportions of the float to the crank casing, the drawing being largely illustrative and the crank casing being shown conventionally only.

Having thus described my invention, what I claim as new and desire to secure by Letters Patent, is:

In a structure of the class described, the combination of a cylindrical metal gage casing having connection to the receptacle to be gaged, a cylindrical metal float constituting a circuit member, a coiled spring arranged above said float and resting thereon, the upper end of said spring being in contact with the casing, said spring constituting an electrical connection for said float to said gage casing, and a pointed contact disposed centrally below said float to be engaged thereby when the float falls and threaded for adjustment in the bottom of said gage casing and insulated therefrom.

In witness whereof, I have hereunto set my hand and seal in the presence of two witnesses.

E. M. BARNES. [L. S.]

Witnesses:
SADIE U. GLASGOW,
HARRY G. HAYES.